INVENTOR
OLE O. RAHM

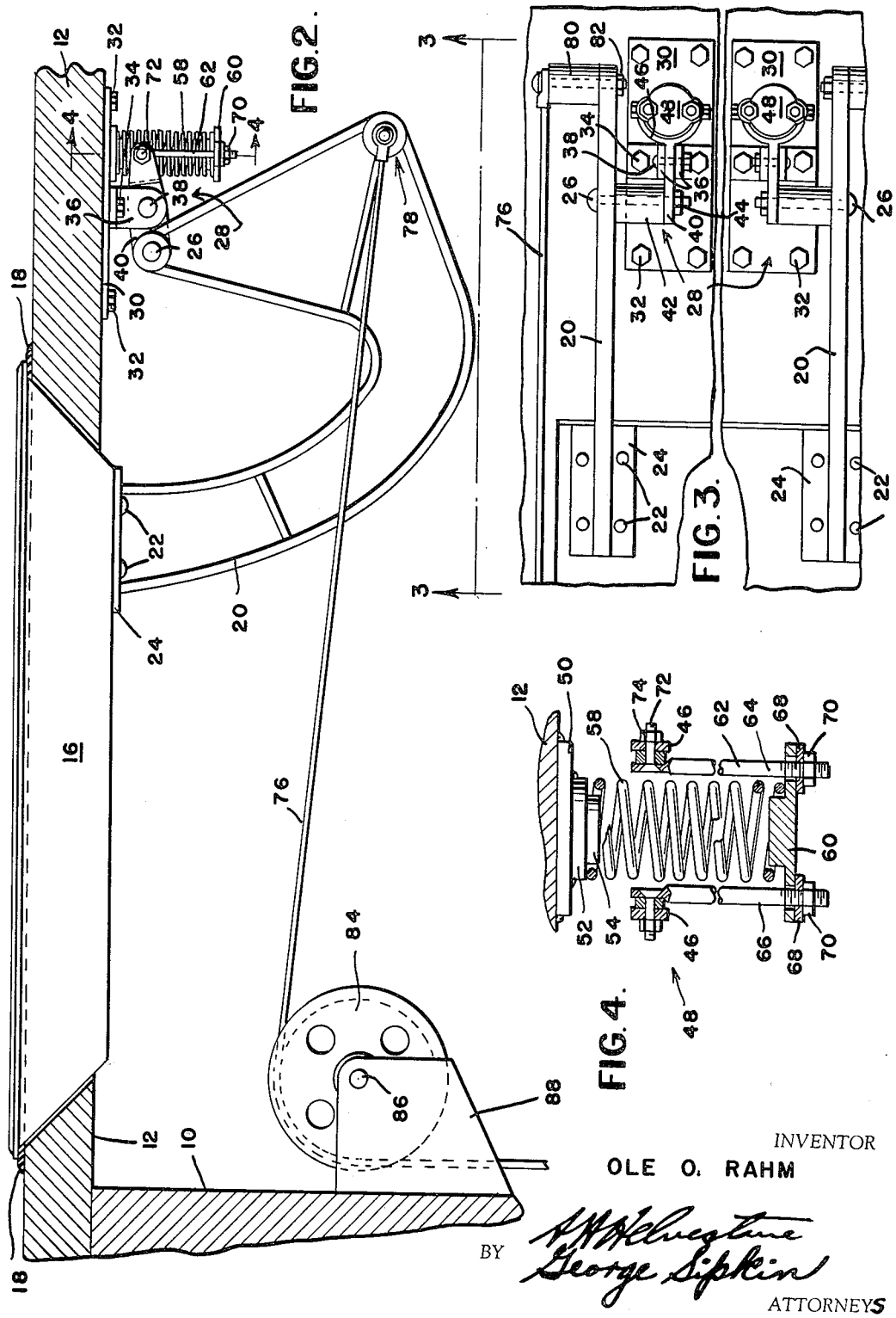

United States Patent Office 2,739,343
Patented Mar. 27, 1956

2,739,343

HATCH COVER AND SELF-ADJUSTING HINGE THEREFOR

Ole O. Rahm, Denver, Colo.

Application July 3, 1951, Serial No. 235,084

1 Claim. (Cl. 16—163)

(Granted under Title 35, U. S. Code (1952), sec. 266)

The invention described herein may be manufactured and used by or for the Government of the United States of America for governmental purposes without the payment of any royalties thereon or therefor.

The present invention relates to closures and more particularly to a novel hinge for use on heavy counter-balanced hatches such as that found on ships.

Prior designs of hatch covers comprise a gasket located on the seating side of the hatch cover and near the outer periphery thereof in order to form a watertight fit when the hatch cover is dogged to the closed position. This type of hatch cover is generally heavy, as much as one thousand pounds or more, and is counterweighted in order to facilitate opening and closing. The hatch is, of course, necessarily hinged to the deck, either on the inside or outside of the deck and the hinges are designed with a floating hinge pin fitted in an elongated hole in the hinge pad. When the hatch cover is open, the hinge pin rests in the bottom of the elongated hole and upon closing of the hatch that part of the gasket on the bottom of the hatch cover nearest to the hinge is the first portion to come into contact with the top of the deck or other seating structure. At this point in the hatch closing process, it is necessary to dog the hatch, and this is accomplished by the wedging action of dogs which are evenly spaced along the outer periphery of the hatch cover. In such forms of hatch covers, the closing action includes combined horizontal and vertical movement in order to drive a hatch cover to its final closing position. For example, in a particular arrangement, the hatch cover must move forward approximately 1/8" while simultaneously traveling in a downward vertical direction a final 3/16" to a completely dogged position. However, such operation is extremely difficult as a practical matter, since the hinge pin must move vertically in the slot while the hatch cover is being dogged, in order to allow the pressure, which is applied by the dogs, to be equally distributed on all areas of the gasket. This vertical movement is such that the hinge pin binds in the seat thus making vertical movement of the hatch cover difficult. To overcome the forces described above in placing the hatch cover in a dogged position, the cooperation of two men is required in an area that is limited in space and this creates a hazardous situation when, for example, the men have to stand at the top of a ladder positioned immediately below the hatch cover.

It is therefore a primary object of the invention to provide a hatch cover that provides for ease in opening and closing of same.

Another object is to eliminate the friction between the hatch cover and the deck developed during the hatch cover closing process so that the hatch cover may be efficiently operated and controlled by one man.

Another object of the invention is to eliminate floating hinge pins for heavy hatch covers and substitute therefor a rocker that carries the weight of the hatch cover and has a spring acting on it opposing the weight of the hatch cover.

Another object of the invention is to provide a novel hinge design for a hatch cover which will automatically align itself vertically thus eliminating the alignment problem now existing in making the installation of present type hatch covers.

Still another object of the invention is the provision of a new type of hinge which can be manufactured and assembled in the shop, thus simplifying both fabrication and installation.

With these and other objects in view, reference is now made to the accompanying specification and drawings wherein like reference characters denote like parts in the drawings in which:

Fig. 2 is a side elevational view, partly in section, of the hatch cover and hinge in fully closed position;

Fig. 3 is a view, partly broken away, of the novel hinge pin arrangement and taken substantially on the lines 3—3 of Fig. 2;

Fig. 4 is a detailed sectional view of the spring portion of the novel hinge and taken substantially on the lines 4—4 of Fig. 2.

Figure 1:
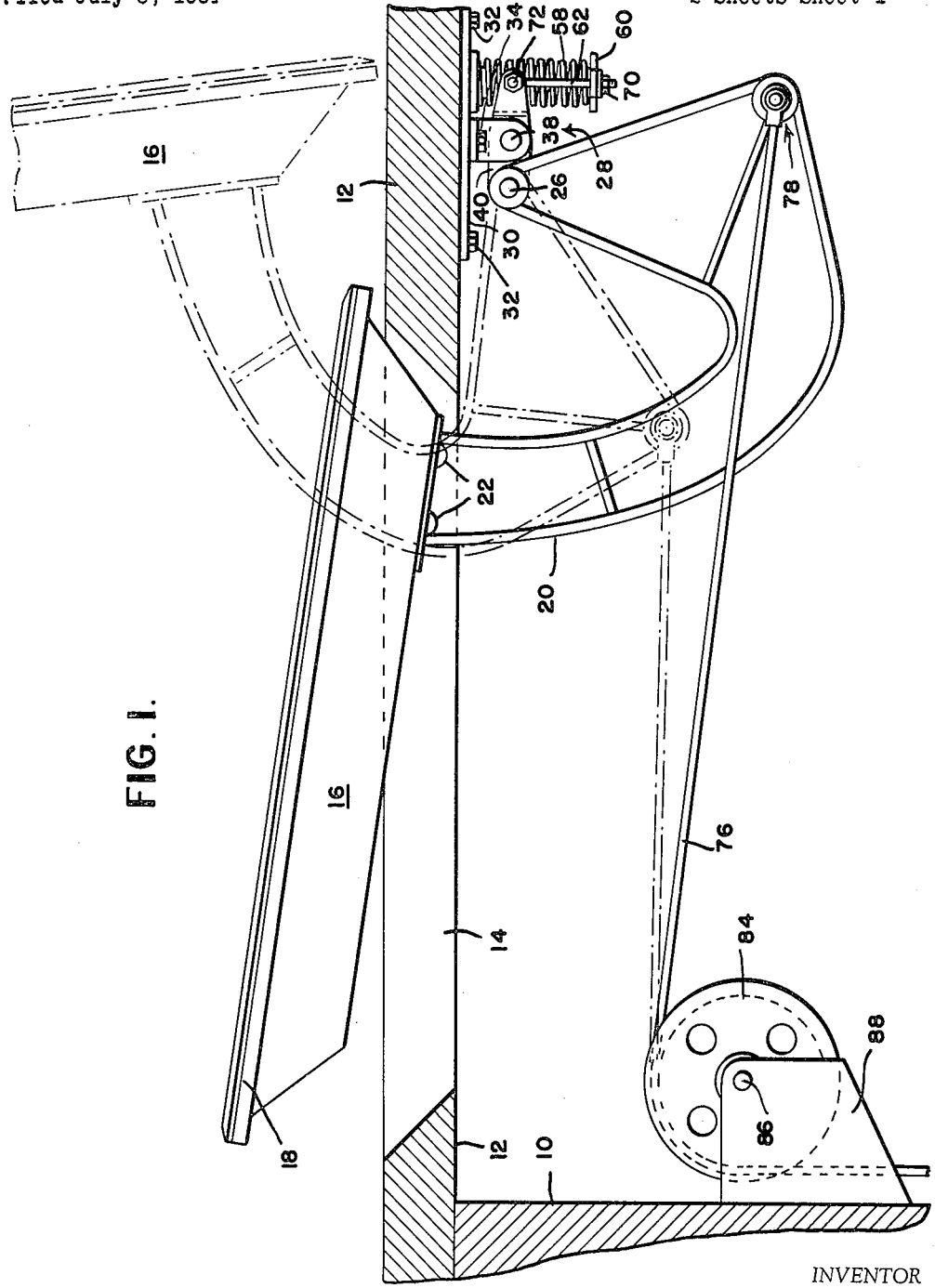
Fig. 1 is a side elevational view showing by dotted lines, the hatch cover in the fully open position and by the solid lines, the hatch cover in the partially closed position.

As shown in Figures 1 and 2, 10 indicates a bulkhead of a compartment supporting a deck 12 thereabove. Located in the deck 12 is a hatchway 14 provided with a hatch cover 16 used for sealing the compartment when the hatch cover is in the closed position. Permanently affixed to the underside of the cover 16 and near the outer periphery thereof, is a gasket 18, made of any suitable material, such as rubber or neoprene, which is adapted to form a watertight seal between the hatch cover 16 and the upper side of the deck.

The cover 16 is supported, when in any position other than the fully closed position, through a connection comprising two spaced, parallel beams or arms 20 which are secured to the bottom of the cover 16 by bolts 22, said bolts passing through appropriate holes or openings in a plate 24, which is formed as a permanent part of the upper end of the floating beams 20 as by welding or as being cast integral therewith. The other ends of the beams are held in position by pivot pins 26, the latter comprising the means about which the beams 20 and cover 16 are adapted for rotative movement. Since these two beams are allochiral in structure and are supported by similar rocker assemblies, description of only one of said rocker assemblies will be hereinafter given, it being understood however that there are two beams, each with its own rocker assembly which in turn is secured to the deck 12.

The rocker assembly is generally indicated at 28, Figures 2 and 3, and comprises a deck plate 30, bolted or otherwise secured, as by bolts 32, to the underside of main deck 12 and fixed to said deck plate 30 by means of bolts 34, is a plate supporting two spaced parallel brackets 36. These brackets have transversely aligned holes which are adapted to receive a supporting pivot pin 38 which serves to support a lever in the form of a rocker arm 40 at its center. The left side of rocker lever 40 has a transverse hole which is adapted to receive pivot pin 26 which extends through an end of beam 20, spacer 42, rocker lever 40 and is held in position by nut 44.

It is to be noted from Figures 1 and 2 that the pivot pins 38 carry the weight of the hatch cover 16 in open position, the weight being transmitted through the pins 38 to the sets of brackets 36 and plate 30. The weight produces a moment on the lever 40 tending to turn it counter-clockwise.

The right side of said rocker arm 40 comprises two forked arms 46 which are adapted to contain a spring loaded counterbalancing structure generally indicated by 48. As shown in detail in Figure 4, the structure 48 comprises a plate 50 appropriately secured to deck 12, as by welding, and spring guides 52 and 54 likewise secured by welding to plate 50. The upper end of a spring 58 is adapted to surround guide 54 and seat on the flat surface of guide 52 and is held at its lower end by guide 60 in stirrup 62 comprising bars 64 and 66. Guide 60 is supported on bars 64, 66 by means of washers 68 and nuts 70 which are threaded on to said bars in such a fashion that by taking up on the nuts, the spring 58 can be initially compressed to the extent necessary for proper operation of the hatch cover. The bars 64, 66 depend from forked arms 46 and are affixed thereto by machine screws 72 and nuts 74.

The weight of the hatch cover 16 and supporting beams 20 is such that it is desirable to have a further counterbalancing force available in order to aid in the hatch cover opening process. This is well known and in common practice in the art and a counter-balancing means is generally shown herein as comprising a cable 76 secured at a middle portion 78 of beam 20 by means of a spacer 80 and bolt 82. The cable 76 extending from beam 20 is wrapped around a pulley 84 and extends to a counterweight positioned therebelow. The pulley 84 is rotatable on an axle 86 in bracket 88 which is secured to bulkhead 10.

Operation

The operation of the invention is as follows:

Assuming the hatch cover to be in the open position, as shown in the dotted lines of Figure 1, force is applied to the hatch cover 16 and it descends to hatchway 14 in deck 12. It is to be noted that the beams 20, supporting the hatch cover, are substantially U-shaped or reversely-bent so as to enable such beams to be pivoted at 26 beneath the deck 12 and still clear said deck when the hatch cover is moved toward the open or closed position. At this time, pin 26, which is almost on the same axis or level with hatchway 14, but preferably positioned slightly below, is in its upper position and thus keeps gasket 18 above the deck out of contact with the deck. Upon application of further pressure to the hatch cover, it becomes substantially horizontal with and assumes a position directly over the hatchway. The dogging down action may now take place. The dogs pull the hatch cover in a downward direction about a fraction of an inch because of the wedging action of said dogs which are spaced evenly along the periphery of the hatch cover. This dogging action of the cover compresses the gasket 18 and makes a watertight seal with the deck, while at the same time securing the cover to the deck. The downward motion caused by the dogging moves the pin 26 downward, causing rocker lever 40 to turn on pivot pin 38 and to move the nut 72 and stirrup 62 upward. The upward motion of stirrup 62 causes spring 58 to shorten whereby its force is increased, as shown in Figure 2. When undogging the hatch cover, prior to opening, the added force in spring 58 causes rocker lever 40 to turn on pivot pin 38 and pin 26 moves upward, gasket 18 becomes free from the deck and the opening of the hatch cover may begin.

For successful operation of the hatch cover, it is important that the force in the spring 58 be just large enough to keep the pin 26 on rocker lever 40 in its upper position during the opening and closing movement of the hatch cover. This force is initially placed in the spring by taking up on nuts 70 when the hatch cover assembly is initially installed on the ship. When the lever 40 is forced counter-clockwise, the spring 58 is compressed, thereby increasing its turning moment around the pivot 38, and counter-balancing, in part, the weight of the cover 16, making it easier to raise the cover in the next opening operation. In the final closing position of the hatch cover 16, the pin 26 is in its lower position.

It is now apparent that the present invention has eliminated the friction caused by the rubber gasket in presently installed hatch covers, by keeping the hinge side of the hatch cover raised so that the gasket does not touch the deck before the hatch cover achieves its proper horizontal position just prior to dogging in the manner well known in the art.

Various modifications of the present invention are contemplated and may obviously be resorted to by those skilled in the art without departing from the spirit and scope of the invention as hereinafter defined by the appended claim.

What is claimed is:

Mechanism for closing a frame opening comprising a medially-pivoted rocker member carried by said frame, an arm carried by one end of said rocker member in a freely swingable disposition about a pivotal axis, a closure cover rigidly carried by and freely swingable with said arm, said cover being free to swing toward and away from closure disposition in an arcuate path defined only by said arm acting as a radius, and resilient means acting on the other end of said rocker member, said resilient means acting in opposition to said freely-swung arm and cover for urging said rocker member in a cover-opening direction and also for holding said rocker member in a balanced static position during the freely swinging movement of said arm and cover, whereby the pivotal axis of said arm and cover remains stationary, said resilient means further being yieldable in response to cover closing pressures exceeding the normal pressure exerted on said rocker member by said freely swinging arm and cover whereupon said rocker member can pivot in a cover-closing direction for shifting the pivotal axis of said arm and varying the arcuate movement of said cover.

References Cited in the file of this patent

UNITED STATES PATENTS

| | | |
|---|---|---|
| 681,624 | Cowles | Aug. 27, 1901 |
| 799,714 | Cable et al. | Sept. 19, 1905 |
| 933,070 | Gleason | Sept. 7, 1909 |
| 1,802,943 | Grieshaber | Apr. 28, 1931 |
| 2,184,341 | Ferris | Dec. 26, 1939 |
| 2,521,756 | Slopa | Sept. 12, 1950 |
| 2,668,980 | Eaton et al. | Feb. 16, 1954 |